United States Patent [19]

Noly

[11] 3,784,852
[45] Jan. 8, 1974

[54] SPEED SELECTOR, IN PARTICULAR FOR CRANES OR HOISTING GEARS

[75] Inventor: Jean Noly, La Clayette, France

[73] Assignee: Potain, Val de Marne, France

[22] Filed: Aug. 1, 1972

[21] Appl. No.: 276,953

[30] Foreign Application Priority Data
Aug. 5, 1971  France .................... 7129485

[52] U.S. Cl. .................. 310/105, 310/76, 310/77
[51] Int. Cl. ................................ H02k 49/02
[58] Field of Search .............. 310/76, 77, 105, 310/103, 93; 198/18 B

[56] References Cited
UNITED STATES PATENTS

| | | |
|---|---|---|
| 1,950,809 | 3/1934 | Nichols ............................ 310/105 |
| 2,628,321 | 2/1953 | Anderson .......................... 310/77 |
| 2,653,256 | 9/1953 | Walley et al. ..................... 310/76 |
| 2,710,359 | 6/1955 | Nixon ................................ 310/76 |
| 2,755,396 | 7/1956 | Lee et al. .......................... 310/77 |
| 3,277,357 | 10/1966 | Willis ............................ 310/77 X |
| 3,493,796 | 2/1970 | Siegel ............................. 310/76 |

Primary Examiner—D. F. Duggan
Attorney—Alvin Browdy et al.

[57] ABSTRACT

The invention relates to a speed selector. The belts drive the inductor of an eddy-current clutch. When the latter is energized together with the yoke, which puts off the brake against the action of the spring, the shaft is caused to rotate. The speed variation is obtained by varying the current intensity in the inductor.

5 Claims, 3 Drawing Figures

PATENTED JAN 8 1974 3,784,852

SPEED SELECTOR, IN PARTICULAR FOR CRANES OR HOISTING GEARS

The present invention relates to a safety speed-varying device intended to be used in particular in cranes or hoisting gears.

The device according to the invention is characterized in that it comprises:

a driving member, such as a pulley or a chain wheel integral with the inductor rotor of an eddy-current clutch;

a bell capping said inductor to complete the eddy-current clutch, said bell being keyed to a shaft housed at the center of the hollow shaft of the inductor and the pulley;

a disc adapted to be rotatively driven by one of the ends of the shaft of the bell;

a brake-lining holder, unable to rotate but movable the axial direction;

a spring system automatically returning the brake-lining holder to its braking position on the disc;

a wound yoke, housed behind the brake-lining holder, said yoke, when supplied with electric current, attracting said holder to a non-braking position against the action of the spring system;

an output tip, constituted by the free end of the shaft of the bell of the eddy-current clutch.

According to a first embodiment, the braking disc is freely movable in the axial direction on the shaft of the bell, whereby its rotation takes place between the movable lining of the lining holder and a fixed braking lining located on its opposite face.

According to another embodiment, the braking disc is rigidly integral with the shaft of the bell, and includes one friction face only, on which the lining of the lining holder can act.

In every case, the control of the speed selector is carried out by varying at will the current intensity in the inductor of the clutch, an electronic control device of known type being associated to the device of the invention.

The motion is stopped by cutting off the supply of current to the inductor and the wound yoke of the brake, so that the selector according to the invention is a safety device, which is automatically blocked or braked in the event of a failure of current.

The attached drawing, given by way of non-limiting example, will allow understanding the features of the invention better.

Figure 1:
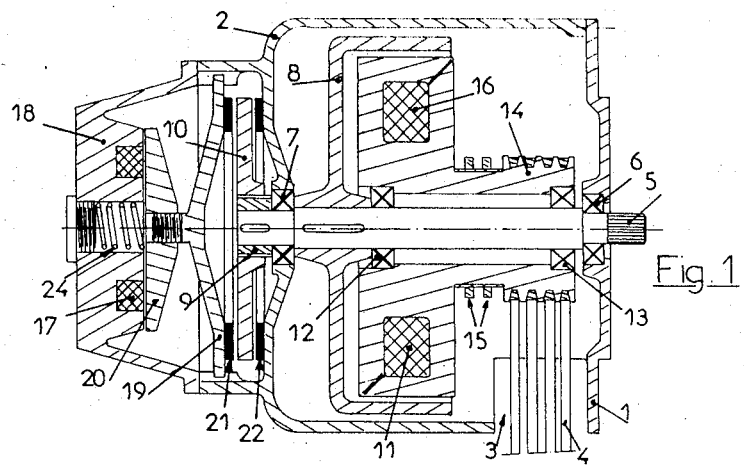
FIG. 1 is an axial section of a selector according to the invention, in its position of rotation.

a. a fixing flange 1;

b. a casing 2, wherein an opening 3 is provided for the belts 4;

c. a central shaft 5 supported by two bearings 6 and 7, and carrying the bell 8 of the eddy-current clutch and a fluted sleeve 9 adapted rotatively to drive a brake disc 10, the translatory motion of the disc 10 in the axial direction being free;

d. an inductor 11 adapted to rotate freely on the shaft 5 through the bearings 12 and 13, said inductor being rigid with the driving pulley 14 and the two rings 15 for the supply of electric current to its coil 16;

e. a wound yoke 17, secured to the casing 2 by the coupling member 18;

f. a brake-lining holder 19, rigid with a movable armature 20;

g. two brake linings 21 and 22, one of which is integral with the holder 19, while the other one is integral with the housing 2; they are disposed on either side of the brake disc 10;

h. a spring 24 for urging the armature 20, the brake lining holder 19 and brake lining 21 against the brake disc 10.

The operation is as follows:

The assembly is mounted on a reduction gear. The shaft 5 is connected to the pinion of said reduction gear, whereas the inductor 11 is rotated at a constant speed by some driving member, through the agency of the pulley 14 and the belts 4.

The rotation of the shaft 5 is obtained by putting off the safety brake by switching on the wound yoke 17, and by supplying electric current to the coil 16 of the inductor 11 through the rings 15. The magnetic flux passes through the gap 23, and generates induced currents in the bell 8. Said induced currents in the bell generate a rotation torque which tends to rotate the bell 8 and, consequently, the shaft 5 in the same direction as the inductor 11 and pulley 14 (FIG. 1).

The speed of the shaft 5 can be adjusted at will by varying the current in the inductor 11. An electronic control device may be provided to this end.

Figure 2:
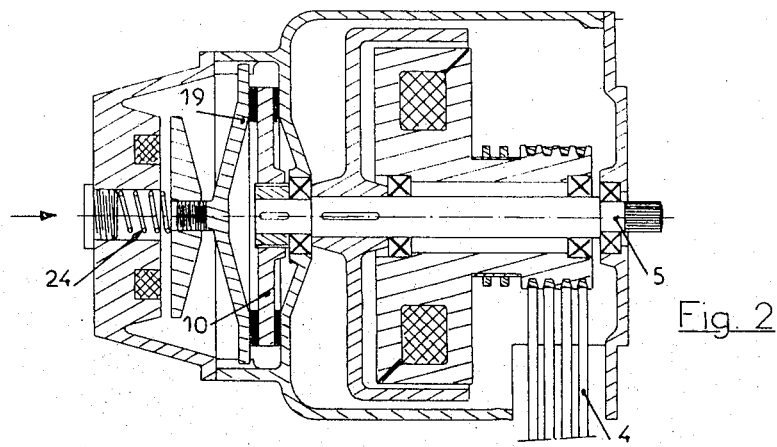
FIG. 2 is a similar view of said selector, in its blocked position.

The motion is stopped by cutting off the supply of current to the inductor 11 of the clutch and the wound yoke 17 of the brake which ends the attraction of the armature 20 to the wound yoke 17: under the action of the spring 24, the linings 21 and 22 stop the rotation of the brake disc 10 and, consequently, of the shaft 5 (FIG. 2).

Figure 3:
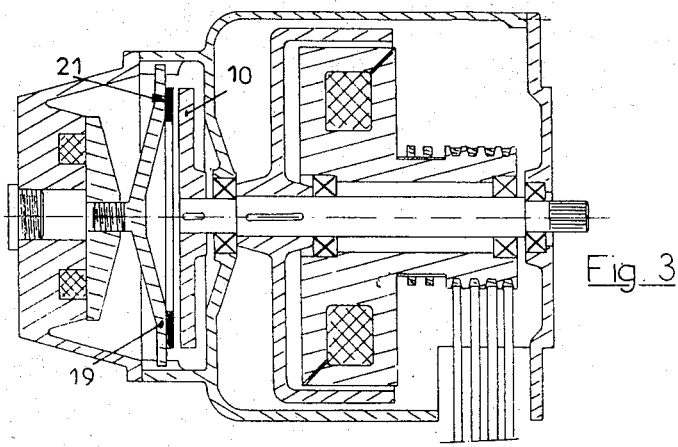
FIG. 3 shows a modification of said selector.

In a modification (FIG. 3), the brake may be designed with one friction face only. The friction disc 10 is then mounted so as to rotate and move axially together with the shaft 5, while the lining 22 is omitted.

I claim:

1. A safety speed-varying device, in particular for cranes or hoisting gears, characterized in that it includes:

a driving member integral with the inductor rotor of an eddy-current clutch;

a bell capping said inductor to complete the eddy-current clutch, said bell being keyed to a shaft housed at the center of the hollow shaft of the inductor and the driving member;

a braking disc adapted to be rotatively driven by one of the ends of the shaft of the bell;

a brake-lining holder adjacent said disc, unable to rotate but movable in the axial direction;

a spring system automatically returning the brake-lining holder to its braking position on the disc;

a wound yoke, housed behind the brake-lining holder, said yoke, when supplied with electric current, attracting said holder to a non-braking position against the action of the spring system;

an output tip, constituted by the free end of the shaft of the bell of the eddy-current clutch.

2. A speed-varying device according to claim 1, characterized in that the braking disc is freely movable in the axial direction on the shaft of the bell, so that its rotation takes place between the movable lining on the lining holder and a fixed braking lining located on its opposite face.

3. A speed-varying device according to claim 1, characterized in that the braking disc is rigidly integral with the shaft of the bell, and includes one friction face only, on which the lining of the lining holder can act.

4. A speed-varying device according to claim 1, means for further including varying at will the current intensity in the inductor of the clutch.

5. A speed-varying device according to claim 1, comprising means to stop the motion by cutting off the supply of current to the inductor and the wound yoke of the brake, so that the reduction gear according to the invention is a safety device which is blocked automatically in the event of a failure of current.

* * * * *